US008224364B2

(12) United States Patent
Gurney et al.

(10) Patent No.: US 8,224,364 B2
(45) Date of Patent: Jul. 17, 2012

(54) METHOD FOR QUIETING AND SENSING IN A SECONDARY COMMUNICATIONS SYSTEM

(75) Inventors: David P. Gurney, Carpentersville, IL (US); Bruce D. Mueller, Palatine, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 410 days.

(21) Appl. No.: 12/623,588

(22) Filed: Nov. 23, 2009

(65) Prior Publication Data

US 2011/0124291 A1 May 26, 2011

(51) Int. Cl.
*H04Q 7/20* (2006.01)
(52) U.S. Cl. ............ 455/509; 455/67.11; 455/445; 455/426.1; 455/450; 370/310; 370/328; 370/329; 370/343; 370/345
(58) Field of Classification Search .......... 455/509, 455/522, 68, 69, 67.11, 500, 517, 426.1, 455/426.2, 403, 422.1, 445, 552.1, 550.1, 455/553.1; 370/310, 328, 329, 343, 345
See application file for complete search history.

(56) References Cited

U.S. PATENT DOCUMENTS

| 7,483,700 | B2 | 1/2009 | Buchwald et al. |
| 2004/0028003 | A1 | 2/2004 | Diener |
| 2008/0090581 | A1 | 4/2008 | Hu |
| 2008/0165754 | A1 | 7/2008 | Hu |
| 2009/0016293 | A1 | 1/2009 | Kang et al. |
| 2009/0274081 | A1 | 11/2009 | Kwon et al. |
| 2009/0286480 | A1* | 11/2009 | Cho et al. .............. 455/62 |
| 2010/0227622 | A1* | 9/2010 | Mody et al. ........... 455/452.1 |
| 2011/0026376 | A1* | 2/2011 | Memik et al. ............ 369/6 |

FOREIGN PATENT DOCUMENTS

EP 1914942 A1 4/2008

OTHER PUBLICATIONS

International Search Report and Written Opinion for International Application No. PCT/US2010/055925 mailed on Jan. 21, 2011.
Cordeiro C., et al., "An Introduction to the First Wireless Standard Based on Cognitive Radios", Journal of Communications Academy Publishers, Oulu, FI, vol. 1, No. 1, Apr. 1, 2006, pp. 38-47.

* cited by examiner

*Primary Examiner* — Keith Ferguson
(74) *Attorney, Agent, or Firm* — Anthony Curtis; Barbara R. Doutre

(57) ABSTRACT

A method of retaining channel use by a secondary system is described. A secondary channel used during periods of normal communication between a secondary transmitter and receiver is split into sub-bands for use during a quiet period containing quiet phases. During the quiet period, while the transmitter communicates with the receiver on one sub-band, the receiver simultaneously senses for incumbent devices on another sub-band, as well as vice-versa. Transmission and sensing do not occur simultaneously on the same sub-band and transmission is limited to only one of the sub-bands. Transmission and sensing are performed by both the transmitter and the receiver on every sub-band over the course of the quiet period. The locations of secondary receivers are determined and employed during scheduling such that devices sufficiently separated from each other transmit during different quiet phases and transmit and sense in sub-bands separated by another sub-band.

19 Claims, 6 Drawing Sheets

METHOD FOR QUIETING AND SENSING IN A SECONDARY COMMUNICATIONS SYSTEM

TECHNICAL FIELD

The present application relates generally to secondary communication systems and more particularly to a method for quieting and sensing other channels in a secondary communication system.

BACKGROUND

In wireless communications, different frequency bands are set aside by the Federal Communications Commission (FCC) for different purposes. Users of a particular frequency band may be primary or secondary, licensed or unlicensed users. Existing users of a particular frequency spectrum are called incumbents of that spectrum. A Cognitive Radio (CR) is typically an unlicensed secondary device that relies on dynamic spectrum access techniques to gain access to spectrum that is used by incumbents (e.g., primary licensed users). For example, in the Television White Space (TVWS) spectrum, typical incumbents include television and wireless microphone transmitters. Other licensed secondary devices include public safety radio operators.

Cognitive Radios operate on secondary channels—frequencies that may be used intermittently by the primary/licensed devices. Regulatory bodies such as the FCC are in the process of establishing rules governing the use of spectrum by secondary devices. As the use of secondary channels is permissive and is reserved for higher priority communications, any Cognitive Radios operating on such a secondary channel must monitor the channel for communications from primary devices and change transmission and reception parameters to avoid interfering with these communications.

Sensing of the active communications channel by a Cognitive Radio is performed periodically using "a quiet period." This is a period of time in which all Cognitive Radio system communications on the channel cease, thereby allowing Cognitive Radios to sense for higher priority/incumbent signals in a radio-quiet environment. If a higher priority signal, e.g., a licensed or unlicensed narrowband wireless audio equipment signal such as wireless microphone signal in U.S.TVWS spectrum is detected, under the current FCC rules, the Cognitive Radio must vacate the channel.

However, once a communications channel has been selected by the Cognitive Radio, it may be desirable for the Cognitive Radio network to retain the selected channel due to limited available spectrum. This may be especially problematic in an urban environment, where there may only be a few channels available for use. As there are a large number of heterogeneous secondary systems that may attempt to capture the occupied channel during a quiet period, the resulting determination of which system may use the channel is inefficient. In one example, during the quiet period, any signal or emission that looks like one or more narrowband (200 KHz) signals is given priority and will capture the channel, even if the previous user actually has priority.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
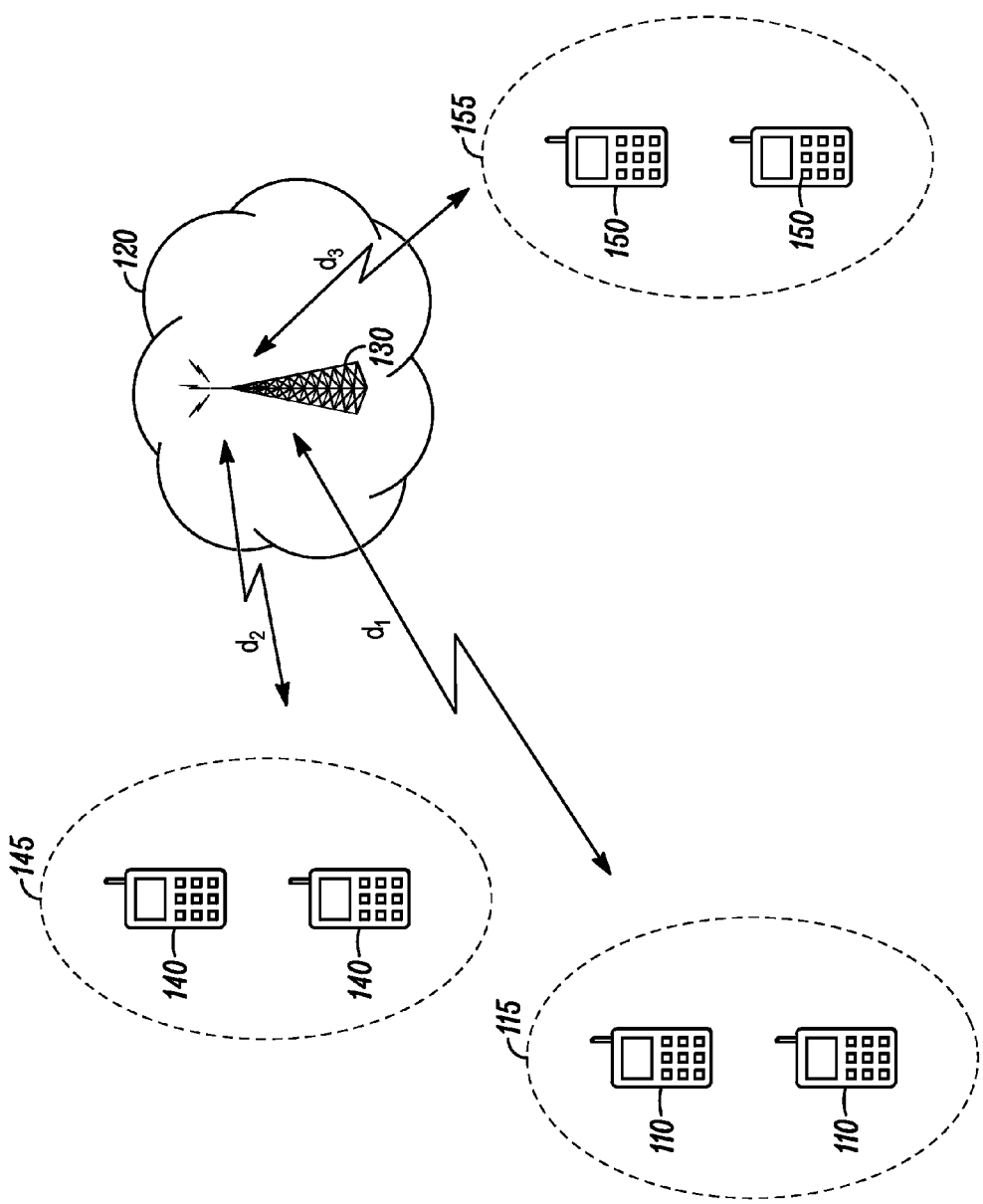
FIG. 1 illustrates one embodiment of a communication system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments of shown.

The apparatus and method components have been represented where appropriate by conventional symbols in the drawings, showing only those specific details that are pertinent to understanding the embodiments shown so as not to obscure the disclosure with details that will be readily apparent to those of ordinary skill in the art having the benefit of the description herein. Other elements, such as those known to one of skill in the art, may thus be present.

DETAILED DESCRIPTION

Before describing in detail the various embodiments, it should be observed that such embodiments reside primarily in combinations of method steps and apparatus components related to secondary radio systems and devices, such as Cognitive Radios. In these embodiments, only partial quieting of the active secondary communications channel occurs. This partial quieting prevents competing secondary systems from taking over the channel during quiet period sensing and may indirectly make the secondary system currently using the channel appear as a class of protected incumbents, which in turn may allow priority access of the communications channel. It also may ensure spectral availability even in spectrally congested environments, such as suburban and metropolitan areas. This increases the quality of service (QoS) for secondary communications due to less frequent channel changing and/or higher apparent priority of the communications. Moreover, there is little, if any, degradation in achievable secondary communications throughput compared to traditional quiet period methods. It also guarantees lower latency levels for the secondary system.

As shown in FIG. 1, a secondary radio system 100 includes, among other known elements, an infrastructure 120 that contains a base station 130. As shown, several sets of subscribers 115, 145, 155, each containing one or more subscribers 110, 140, 150 communicate with other subscribers via the base station 130. The sets of subscribers 115, 145, 155 are different distances $d_1$, $d_2$, $d_3$ from the base station 130. The subscribers 110, 140, 150 are part of a secondary radio system and may also function as a primary radio system in certain circumstances, for example on channels for which the system is licensed. Such systems use a secondary communication mode when additional communication resources (channels) are desired and all primary resources are unavailable. The following will however consider the subscribers 110, 140, 150 to be secondary devices using a secondary channel. Examples of secondary systems include Cognitive Radio systems and emergency incident scene response or critical infrastructure (such as smart grid) systems.

Figure 2:
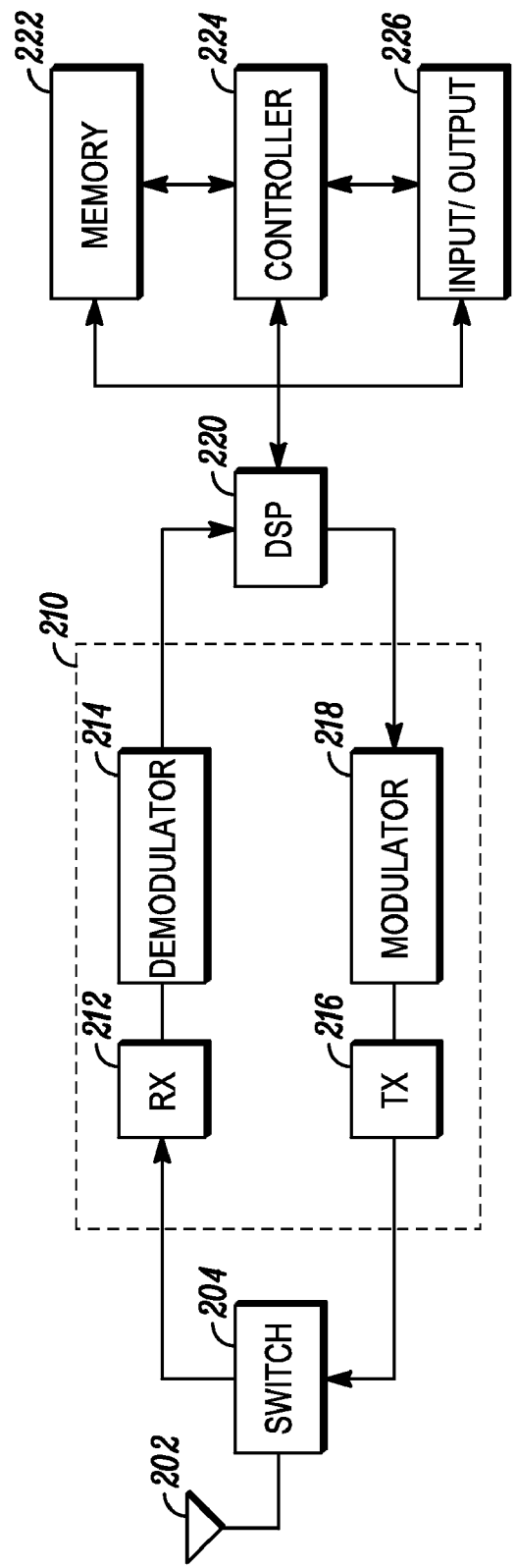
FIG. 2 illustrates a block diagram of an embodiment of a subscriber.

FIG. 2 illustrates an embodiment of a schematic block diagram of a subscriber 200. The subscriber 200 can be either a fixed or mobile device. The subscriber 200 operates in one or more spectral ranges that may be contended or reserved for licensed primary devices. As above, one example of a subscriber 200 is a cognitive radio station.

The subscriber 200 looks for incumbent activity at particular frequencies. These frequencies may be selected by employing incumbent information that is accessible to the subscriber 200. For example, cognitive radios typically sense and operate in the frequency band of unused television channels. Television channel use (and other higher priority channel use) by incumbent devices in a given region may be provided by one or more geo-location databases that are accessible to the subscriber 200. Incumbent devices may include TV, Broadcast Auxillary Services, Land Mobile Radio, Radio-telephone, wireless microphone, and cable head-end systems (transmitter or receivers). Before initiating communication with the base station, the subscriber 200 selects one or more frequencies (e.g., as indicated as available by a geo-location database), senses at those frequencies to locate one or more that are currently available, and selects a particular available frequency. The subscriber 200 then starts operating on this frequency as a secondary device. Once secondary operation has commenced however, the subscriber 200 periodically re-checks the spectrum in which the channel is located to ensure that an incumbent device or another secondary device of higher priority does not wish to use the same channel and that it does not substantially interfere with such devices operating nearby. In the U.S. TVWS, FCC operating rules currently require secondary (CR) devices to scan for certain types of incumbents on their operating channels, and vacate the channel (e.g., within one minute) if certain types of incumbents (e.g., wireless microphones) are detected on the channel.

The subscriber 200 may contain, among other components, an antenna 202, a transceiver 210 and an antenna switch 204 (or duplexer/diplexer) coupling the antenna 202 and transceiver 210. The transceiver 210 includes known circuitry and components for frequency generation, filtering, modulation, demodulation, amplification, and so on. The antenna switch 204 may connect the antenna 202 to either the transmit or receive path of the transceiver 210. A processor 220, such as the DSP shown in FIG. 2, typically generates signals from digital data provided to the DSP 220 for transmission by the subscriber 200, and processes signals received from the transceiver 210 to provide digital data to other components of the subscriber 200. The signals may be baseband signals or intermediate frequency (IF) signals.

In one embodiment of the receive path of the transceiver 210, a signal is received by the antenna 202 and fed to a receiver 212 through the antenna switch 204. The receiver 212 is tuned to a desired receive frequency and bandwidth. The receiver 212 filters and amplifies received signals and feeds the received signal to a demodulator 214. The demodulator 214 produces one or more signals that are provided to the DSP 220 in a known manner, e.g., being converted from analog signals to digital signals by an analog-to-digital converter. Similarly, in the transmit path of the transceiver 210, the modulator 218 receives a digital signal from the DSP 220 and, e.g., converts the digital signal to an analog signal using a digital-to-analog converter. The modulator 218 modulates a radio frequency carrier or carriers according to known digital modulation techniques. The modulated signal is supplied to a transmitter 216 for amplification and transmission to the antenna 202 through the antenna switch 204.

A controller 224 controls the subscriber 200. The controller 224 may be a microprocessor, which is coupled to a memory 222. The memory 222 may include read only memory (ROM), random access memory (RAM), re-programmable memory and so on. The memory 222 stores instruction code that is executed by the controller 224, causing the subscriber 200 to perform various tasks and operations. The memory 222 stores code related to the operating system, applications, data structures, variables, virtual machines, and other software entities of the subscriber 200. The memory 222 may also be used to support operation of the DSP 220. As is known, the memory 222 is coupled to the controller 224 and DSP 220 via a bus using standard interfacing and addressing means.

The subscriber 200 may further comprise various I/O devices 226 such as a speaker, a microphone, a keypad and other buttons or input components, and a graphic display. These are I/O devices 226 are connected with the DSP 220 and controller 224 to permit various perceivable (e.g., audio, visual, tactile) signals to be provided to the user of the subscriber 200 based on signal received at the antenna 202 as well as various inputs from the user to be transmitted by the antenna 202.

The subscriber 200 is designed to be able to sense various frequencies and detect the presence or absence of signals on a particular frequency. Different sensing methods (e.g., spectral feature detection, energy detection, etc.) may be used to sense the channels. The sensing methods may be implemented as instruction code sets stored in the memory 222 and performed by the DSP 220 on samples received by the receiver 212. Each sensing method can have adjustable parameters or settings for various thresholds, set independently or in response to detecting the channel conditions of signals received from the base station. These channel conditions may be based on the determination of errors in reference information such as pilot or synchronization symbols embedded in the received signal and known to the subscriber 200. In response, the DSP 220 may produce channel and noise estimates and adjust the thresholds or sensing methods accordingly. The channel estimate indicates the channel type, indicating the fading type and rate of fading, which are produced by movement of the subscriber 200, as well as multipath and shadowing effects. The noise estimate indicates the general noise incident in the channel. This information may be used to anticipate received signal distortion and make appropriate corrections.

In establishing communications using a secondary channel, the subscriber 200 thus finds a channel that is not occupied by an incumbent (e.g., through a geo-location database), performs sensing for any other incumbent signals, and then begins secondary operation on that channel. The system periodically re-scans the channel to determine whether any incumbent or secondary device having a higher priority wishes to use or begins using the channel. The subscriber 200 may select one or more methods for sensing the channel conditions (such as fading rate and noise) and incumbent signal types and determines the channel conditions as above and then ascertains whether an incumbent signal is present. Alternatively, the subscriber 200 may use sensing methods that are independent of channel conditions. Many such methods are known to those skilled in the art.

Traditionally, sensing is performed during a quiet period, which is a short radio-quiet time period that is enforced on all secondary systems operating in the network. The use of a quiet period is suggested by regulatory bodies such as the FCC and allows all subscribers to sense for incumbent traffic in an interference-free environment. During the quiet period, all secondary devices cease transmission on the active channel and sense for protected incumbent signals on the (previously) active channel. For example, in the United States, the FCC requires detection of wireless microphone signals down to a level of −114 dBm within 60 seconds. The detection circuitry in the subscriber 200 may require observation of the channel for 300 ms to reliably achieve this detection threshold, which could be broken into a single 5 ms channel observation every second. Alternatively, a subscriber could perform ten 30 ms incumbent sensing decisions, and take a majority vote of sensing results. Quiet periods are scheduled as often as needed to meet a given detection threshold, and are required to cover the entire frequency span of the sensed channel.

The quiet period typically occurs between periods of normal communication when sensing does not occur and when the entire channel is used for communication between the base station and one of the subscribers 110, 140, 150. As shown in the frequency-time graph of FIG. 3, a conventional quiet period may follow a certain number of downlink and uplink communications (respectively between the base station 130 and subscribers 110, 140, 150 and between the subscribers 110, 140, 150 and base station 130) and occurs before the next set of downlink and uplink communications. Alternatively, quiet periods may be scheduled at predetermined time periods, independent of secondary communications on the channel. During such times, all secondary device transmissions cease, as described above. However, the use of such conventional quiet periods engenders the problems described previously.

Figures 3, 4:
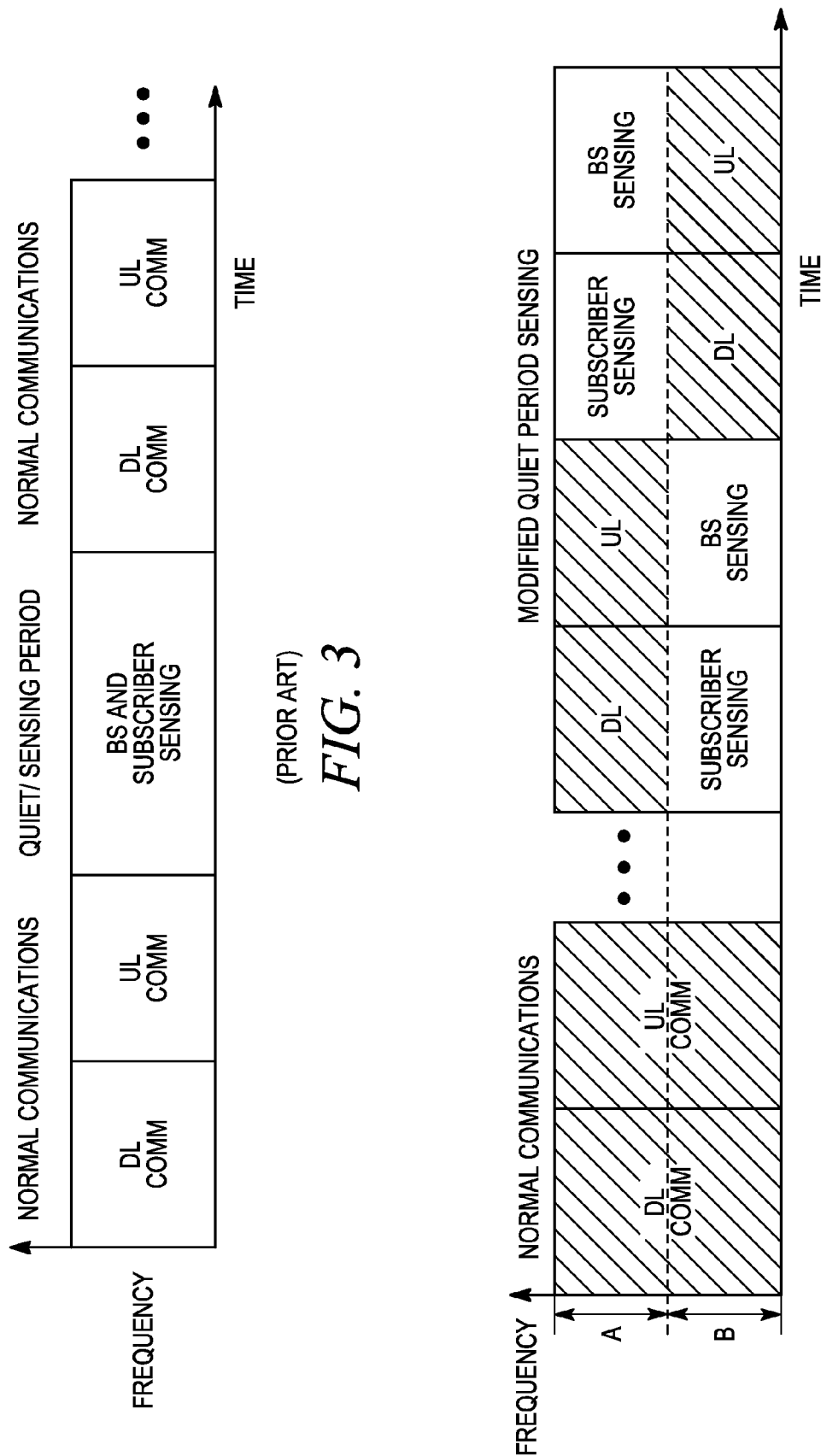
FIG. 3 is a frequency-time graph showing a conventional quiet period.
FIG. 4 is a frequency-time graph showing one embodiment of a modified quiet period.
Figure 5:
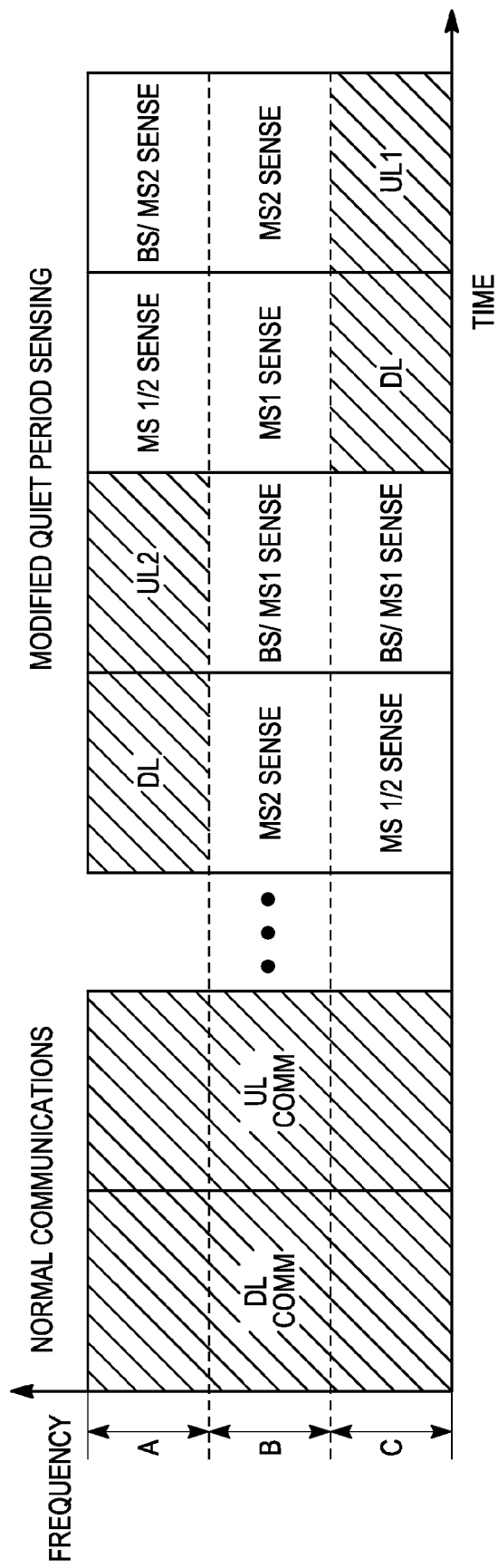
FIG. 5 is a frequency-time graph showing another embodiment of a modified quiet period.

The frequency-time graphs of different embodiments of a modified quiet period are shown in FIGS. 4 and 5. These graphs may represent time-frequency resources in an orthogonal frequency division multiple access (OFDMA) system, or other systems that are able to transmit over a selected portion of the channel. Scheduling of activities during the modified quiet period is typically executed by the base station 130. The overall length of the quiet period in each figure may be the same as that shown in FIG. 3. However, unlike the conventional quiet period, the modified quiet period is formed from a plurality of quiet phases each of sufficient duration over the course of the required regulatory time to permit any incumbents present to be detected. Unlike the technique shown in FIG. 3 in which all subscribers remain quiet and sense during the entirety of the quiet period, only a specific set of subscribers 115, 145, 155 in the secondary system remains quiet and senses during each quiet phase. Moreover, unlike the technique shown in FIG. 3 in which all subscribers sense over the entire channel, the sets of subscribers 115, 145, 155 or the base station 130 each sense or transmit in one or more limited frequency ranges (e.g., sense over one portion of the channel or sub-band) which differs from quiet phase to quiet phase. Thus, the communications channel remains active (i.e., is an active communications channel), transmissions occur over a used portion while no transmissions occur over the unused portion.

In the frequency-time graph shown in FIG. 4, which assumes only subscribers 110 are in the system, four distinct quiet phases are present. The channel is split into two sub-bands. During the first quiet phase, the subscribers 110 receive data from the base station 130 in a first (downlink or DL) sub-band A of the channel while sensing for incumbent activity in a second sub-band B of the channel. During this quiet phase, the first sub-band A and second sub-band B of the channel are respectively the occupied and unoccupied portion of the channel. The occupied sub-bands are shaded in FIGS. 4 and 5. During the second quiet phase, the subscribers 110 transmit data to the base station 130 in the first (uplink or UL) sub-band A of the channel while the base station 130 looks for incumbent activity in the second sub-band B of the channel in addition to receiving data from the subscribers 110 in the first sub-band A of the channel. During the third quiet phase, the subscribers 110 receive data from the base station 130 in the second (DL) sub-band B of the channel (which is now the occupied sub-band of the channel) while sensing for incumbent activity in the first sub-band A of the channel (which is now the unoccupied sub-band of the channel). During the fourth quiet phase, the subscribers 110 transmit data to the base station 130 in the second (UL) sub-band B of the channel while the base station 130 looks for incumbent activity in the first sub-band A of the channel in addition to receiving data from the subscribers 110 in the second sub-band B of the channel. Note that the various activities in the quiet phases can be altered such that all activities in a particular quiet phase occur at a different time during the modified quiet period (e.g., the activities that occur during the first and third quiet phase can be swapped).

As is evident from FIG. 4, the channel is not completely relinquished during the modified quiet period. This permits the secondary system to retain use of the channel despite the fact that other secondary systems may be competing for the channel. It also may make the signal present appear as a protected class of narrowband signals, which could even clear channels that are in use by other secondary systems. For example, assume a conventional secondary system sensing with traditional quiet periods and a modified secondary system using quiet phases that are approximately synchronized with the traditional quiet periods; if the modified secondary system attempts to use a channel currently in use by the conventional secondary system, the conventional secondary system would detect the presence of the modified secondary system but the modified secondary system would not sense the presence of the conventional secondary system. Thus, the modified secondary system could begin to transmit on the channel. If the modulation used by the modified secondary system appears to be of a protected class (e.g., narrowband), as it would with the transmissions in the sub-bands during the quiet phases, then it can take over the channel permanently. This is a result of the current FCC regulatory scheme in TVWS. Note that there are no restrictions on occupied bandwidth for secondary signals within a (6 MHz) TV channel in the United States, and there are no restrictions on the type of modulations that may be used by secondary systems.

One manner of selecting the frequencies spanning only a portion of a channel is to use a modulation that can dynamically vary its bandwidth, such as Orthogonal Frequency Division Multiplexing (OFDM). These types of modulations often rely on Fast Fourier Transform (FFT) processing, which is also well suited for many typical incumbent sensing algorithms. Other types of multi-carrier/tone techniques that may be used include use of a Scalable Advanced Modulation (SAM) or High Performance Data (HPD) signal. Variable bandpass filtering or windowing may be used to aid in rolling-off transmission of the frequencies in the undesired portions of the channel. This also enables different sets of subscribers to sense for incumbent signals in the unoccupied sub-band of the channel while useful (e.g., uplink or downlink) communications are still occurring in an occupied sub-band. By judiciously selecting or scheduling of the set of subscribers, the unoccupied sub-band of the channel may be quiet enough during each quiet phase for sensing incumbents at geographical locations not in the immediate vicinity of the active secondary transmitter 130 during a particular quiet phase. For the purposes of much of the discussion below, it is assumed that the base station is the secondary transmitter, and the subscriber units are performing sensing during the modified quiet periods. The same methods apply without any loss of generality when one or more subscriber units are transmitting, and other units in the system (e.g., the base station) are performing sensing.

Note that although local devices do not sense and transmit at the same time, sensing of one sub-band of the channel may take place simultaneously in the same subscriber with data reception in another sub-band of the channel using the same analog-to-digital (ADC) converter and the same fast Fourier transform processing for OFDM signal demodulation and incumbent detection. There is little, if any, effective throughput or sensing efficiency loss for employing partial sensing since the same amount of time-frequency resources are used for data transmission and sensing as that used during the separate conventional sensing and reception periods.

As long as transmitter emissions from the base station 130 or other subscribers are controlled or limited in the unoccupied sub-band of the channel during the modified quiet periods, successful sensing for incumbents can take place by other, non-local subscribers, while useful data transmissions are taking place over another portion of the channel. For example, for a 30 dBm base station transmitter with emissions that are 40 dB down (−40 dBr) in the unoccupied portion of the channel, any actively sensing subscriber units would need to be about 700 m away from the base station unit to avoid desensing the incumbent sensors. This calculation assumes two-ray secondary signal propagation, an antenna height of the base station of 20 m, and an antenna height of the subscriber of 2 m, which results in about 104 dB of propagation loss between the base station and the subscriber (resulting the undesired base station signal components not being above a 114 dBm sensing noise floor at the subscriber). A predetermined level of additional margin may be included to account for channel variations, and other signal propagation models may be utilized without any loss of generality. Conservative secondary signal propagation models (i.e., those that tend to under-estimate signal path loss) will result in quieter sensing periods at the secondary sensing device. The locations of all subscribers in the system may be determined and provided to the base station. This permits the base station to centrally direct and control the sensing scheme of the modified quiet period. The location of a subscriber may be determined directly for example using GPS-based information of the subscriber unit.

The modified quiet period method can also be applied where unit location is not explicitly known, by utilizing Received Signal Strength Indication (RSSI) of in-band signals (e.g., from the base station to the subscriber unit). In one embodiment, the proximity of the sensing unit to the active secondary transmitter can be estimated by using RSSI values (i.e., it can be determined, with very high confidence, that a particular sensing unit is some minimum distance away from the transmitting unit, based on a maximum allowable RSSI level for the transmitted signal). For example, if the transmitted secondary signal falls below some maximum RSSI level (given the simple knowledge of the transmitter power level), it can be reasonably confident (say, using pessimistic fourth law signal propagation models) that the sensing unit is some minimum distance away from the secondary transmitter. In other words, a propagation modeling equation can be solved for distance to the transmitter, based on known secondary transmitter power level, and the observed RSSI level at the sensing unit (possibly along with other system parameters, such as transmit and receive antenna gains, etc.)

Using this information, the subscriber can determine whether it is closer to the base station than a predetermined minimum distance in which signals from the base station desense incumbent sensing by the subscriber using a maximum allowable RSSI level for the signal from the base station. In the event that a subscriber is closer to the base station than the minimum distance, the subscriber may be able to rely on the base station to perform incumbent sensing and relay that information to the subscriber. Often, information about secondary transmitters (e.g., channel, transmit power level, etc.) is broadcast in control messages carried on the system, for traditional system/network management purposes. This information (e.g., secondary transmitter power level) may also be determined through a geo-location database, for known transmitter locations.

Alternatively, measurements of the average RSSI levels for the partially quieted transmitted signal (on the active portion/frequencies of the channel) can be used to more directly determine the local absolute levels of undesired transmitter splatter (in the unoccupied portion of the partially quieted channel) at the secondary sensing receiver, given some knowledge of relative transmitter splatter levels. Note that these relative secondary system transmitter splatter levels could be pre-characterized/known by units in the system, or they could be measured at the secondary transmitter and transmitted periodically along with the data portion of the signal. Average signal levels and relative up-fade/down-fade margin would typically need to be utilized to account for frequency selective fading effects in the unoccupied portion of the channel.

Once a predetermined maximum threshold of absolute splatter is met in the partially quieted portion of the channel, sensing measurements for incumbents can safely take place locally at the receiver. This threshold is typically set to be below the required incumbent detection levels at the receiver (e.g., −114 dBm/200 KHz for wireless microphones in U.S. TVWS). That is, sensing can safely take place when splatter levels are below the required sensing noise floor levels at the receiver. Again, additional margin may be accounted for in the process (e.g., splatter from the secondary transmitter may need to be 6 dB below the required sensing threshold).

In general, different types of incumbents may have different detection thresholds, with some implying even negative incumbent signal detection signal-to-noise ratios (SNR), resulting in different minimum required sensing distances or maximum allowed RSSI levels based on incumbent types. However, the FCC in the U.S. currently requires a unified −114 dBm sensing threshold for all TVWS incumbent types (e.g., digital TV, analog TV and wireless microphones) in the TVWS band. Any improvements in secondary transmitter emissions into the unoccupied sub-band of the channel during the modified quiet period (e.g., due to additional filtering, windowing, transmitter linearization techniques, etc.) results in smaller minimum sensing distances or higher tolerable maximum RSSI values on the occupied sub-band of the channel for the actively sensing subscribers in the system. Using the above techniques, all subscribers can be scheduled to perform sensing in the system, without completely relinquishing the communications channel.

As mentioned above, the method is able to make the subscriber signal appear as if it is a protected class of incumbent signals, which may force other systems to vacate or not initiate communications on that channel. A typical secondary transmitter signal is a flat-topped random wideband modulation that occupies the entire channel bandwidth. As such, it may be seen as a high noise level and not as a particular protected incumbent signal class on the channel by other secondary systems, which may still then attempt to utilize the channel. Due to the incumbent sensing requirements, the current FCC regulations effectively grant protected status (i.e., higher priority) to all licensed and unlicented narrowband communications signals in the TVWS, and multiple wireless microphone signals may be present on a single TV channel. The subscriber signal, which is limited in frequency, appears as narrowband interference on the channel and is thus classified as one or more wireless microphone signals under current FCC regulations, which will require other secondary systems to vacate the channel.

The use of modified quiet periods or quiet phases can also be extended to multiple communications groups within the system as shown in the frequency-time graph. Sensing may be performed by subscribers that are some minimum distance away from the active transmitter that is utilizing a portion of the channel. The minimum distance is again determined by how far down the undesired emissions are in the unoccupied sub-band of the channel that is being sensed. As shown in FIG. 1, there are multiple sets of subscribers 115, 145, 155 in a system whose distances from the base station and from each other set of subscribers is taken into account when being scheduled for modified quiet period sensing.

As shown in FIG. 1, the first and third sets of subscribers 115, 155 are relatively far from the base station 130 (respectively, distance $d_1$ and $d_3$) while the second set of subscribers 145 is close to the base station 130 (distance $d_2$). Again, locations of all subscribers may be explicitly known (e.g., via geo-location databases) or estimated based on known transmit power levels and/or received signal strength measurements. In general, subscribers may be grouped into sets based on their proximity to the base station and other subscribers in the system. The further in the frequency separation from the active transmitter, the lower the undesired emissions are in the unoccupied sub-band of the channel (and the closer sensing can take place to the active transmitter).

To illustrate these principles, a slightly more complicated frequency-time graph than that of FIG. 4 is shown in FIG. 5. Again, a Time-Division Duplex (TDD) system is assumed. The frequency-time graph of FIG. 5 assumes only sets of subscribers 115 and 155 are in the system (and are sufficiently separated in distance). Four distinct quiet phases are again present, however, the channel is divided into three sub-bands A, B, C—two unoccupied and one occupied. During the first quiet phase, the subscribers 110 in the first set of subscribers 115 (shown as MS1) receive data from the base station 130 in the first sub-band A of the channel while sensing for incumbent activity in the third sub-band C of the channel. At the same time, the subscribers 150 in the second set of subscribers 155 (shown as MS2) sense for incumbent activity in the second and third sub-bands B, C of the channel. This technique maximizes the frequency separation between the first sub-band A and the third sub-band C of the channel, reducing the splatter in the sub-band used for sensing (third sub-band C) and decreases the required minimum distance between the sets of subscribers 115 and 155 and the base station.

During the second quiet phase shown in FIG. 5, the subscribers 150 in the second set of subscribers 155 transmit data to the base station 150 in the first sub-band A of the channel. At the same time, the base station 130 and the subscribers 110 in the first set of subscribers 115 sense for incumbent activity in the second and third sub-bands B, C of the channel. During the third quiet phase, the subscribers 150 in the second set of subscribers 155 receive data from the base station 150 in the third sub-band C of the channel while sensing for incumbent activity in the first sub-band A of the channel. At the same time, the subscribers 110 in the first set of subscribers 115 sense for incumbent activity in the first and second sub-bands A, B of the channel. During the fourth quiet phase, the subscribers 110 in the first set of subscribers 115 transmit data to the base station 130 in the third sub-band C of the channel. At the same time, the base station 150 senses for incumbent activity in the first sub-band A of the channel and the subscribers 150 in the second set of subscribers 155 sense for incumbent activity in the first and second sub-bands A, B of the channel. The base station 150 may also sense for incumbent activity in the second sub-band B of the channel during the fourth quiet phase in addition to, or as an alternative to, sensing for incumbent activity during the second quiet phase.

In one example, each quiet phase represents a 5 ms (resulting in a nominal 10 ms frame time). Thus, the subscribers 110 in the first set of subscribers 115 senses the third portion C of the channel for 10 ms and the first and second portions A, B of the channel for 5 ms. Additional sensing periods may be able to reduce future sensing cycle requirements so that, for example, the subscribers 110 in the first set of subscribers 115 may be able to skip sensing of the third portion C of the channel every other modified quiet period sensing cycle, thereby permitting the subscribers 150 in the second set of subscribers 155 to use the third portion C of the channel for additional transmission of data. Once again, as different types of incumbents may have different dwell time requirements based on the required detection SNRs, it is desirable to perform detection for different types of incumbents simultaneously (i.e., overlap quiet periods), in order to minimize the total average required quiet period on the channel. Again, FFT-based sensing processing can readily accomplish this task.

As before, the various activities in the quiet phases can be altered such that all activities in a particular quiet phase occur at a different time during the modified quiet period (e.g., the activities that occur during the second and third quiet phase can be swapped). Moreover, if there is sufficient frequency isolation, the subscribers and base station may sense in the unoccupied portion of the channel adjacent to occupied portion of the channel. In addition, other time-frequency sensing patterns are possible. For example, the modified quiet period may be extended to three frames (DL/UL periods), and only one of three frequency sub-bands may be sensed during each frame. However, all sub-bands must eventually be sensed by all subscribers to meet regulatory requirements.

Additionally, the transmitting power level of the base station or subscribers may be temporarily reduced during the modified quiet periods to allow subscribers more proximate to the active transmitter to perform sensing. In this case, the active transmitter may use different modulation, such as a lower order modulation scheme, to maintain link performance.

Figure 6:
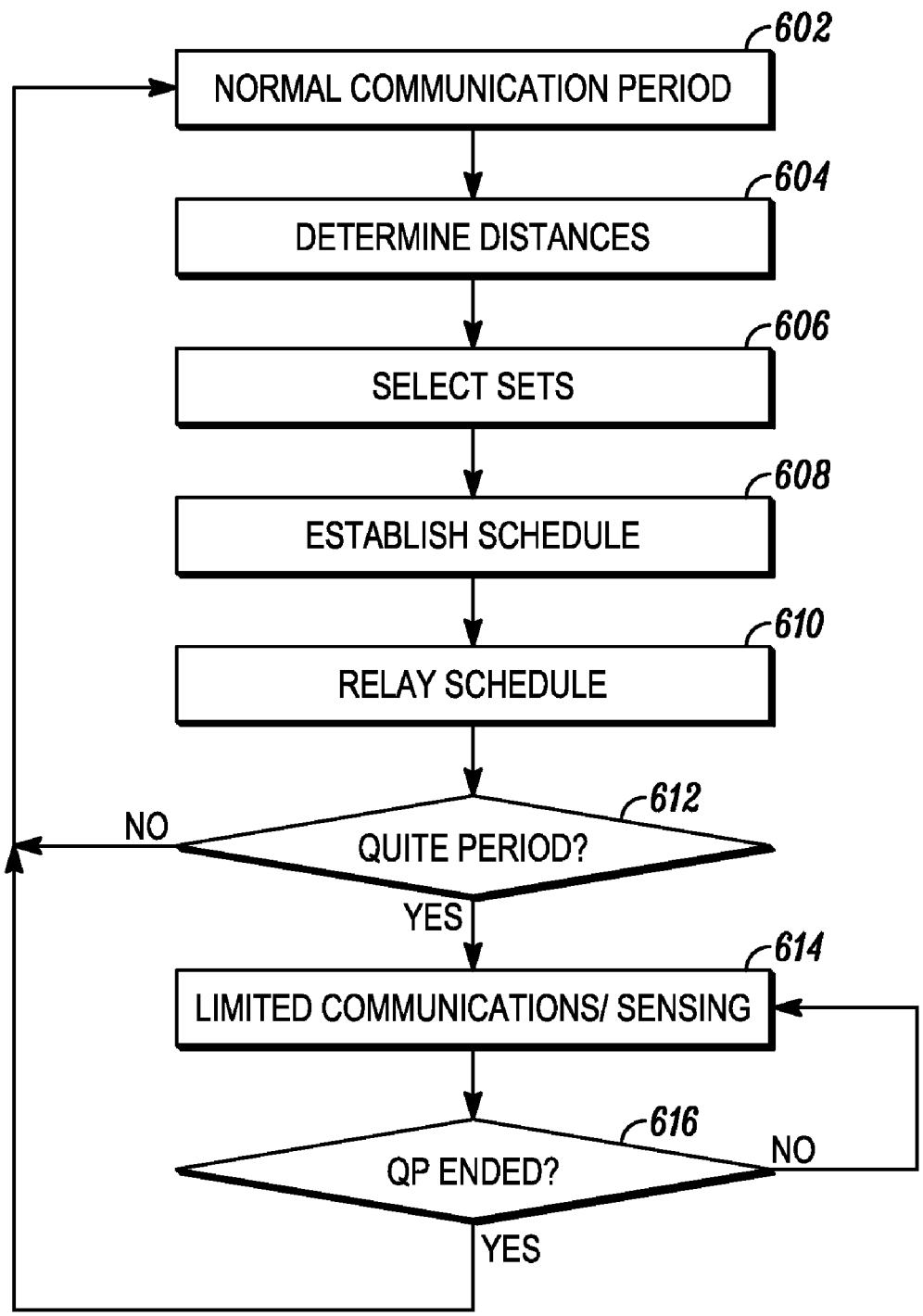
FIG. 6 is a flowchart of one embodiment of operations in the system of FIG. 1.
Figure 7:
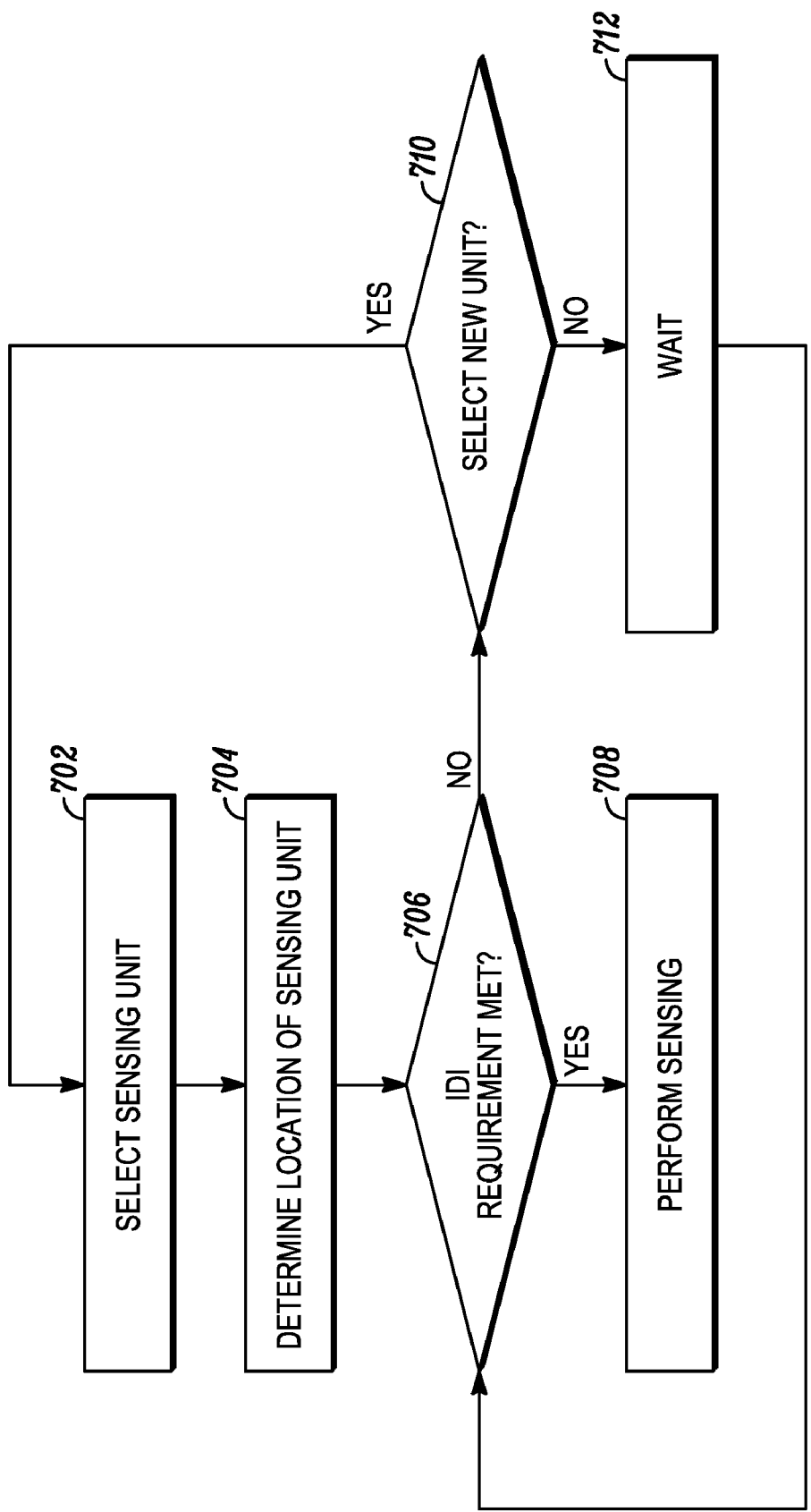
FIG. 7 is a flowchart of one embodiment of operations in the system of FIG. 1.

A flowchart showing one embodiment of a method of providing secondary communications over a channel is shown in FIG. 6. In this figure, normal communication proceeds at step 602. During the course of the normal communications, the base station may determine or indirectly estimate the locations of the various subscribers at step 604, and determines sensing sets of secondary devices based on the proximity at step 606. The base station then typically establishes a schedule for the modified quiet period at step 608 and relays the schedule to the subscribers at step 610. The schedule indicates which set of subscribers are to perform each activity (communicate and sense) in each phase of the modified quiet period, as well as the sub-band of the channel to use. Note that any or all of steps 604-608 indicated as being performed by the base station may be instead be performed by the subscribers or one or more separate devices, as long as both the schedule is communicated to both the base station and the subscribers. As long as it is determined at step 612 that the modified quiet period is not to start, normal communications continue. When it is determined at step 612 that the modified quiet period is to start, the base station and subscribers perform their scheduled activities, which include temporal and frequency limited communications between each other and sensing by the base station and/or subscribers, at step 614. The modified quiet period continues until it is determined at step 616 that normal communications are to be reestablished.

A flowchart showing one embodiment of a method of performing sensing for incumbent signals in a secondary communications system is shown in FIG. 6. In this figure, a sensing unit is selected at step 702 and the location of the sensing unit ascertained at step 704. Once the location is ascertained, the sensing unit determines whether an unused portion of an active communications channel meets an incumbent detection interference requirement at step 706. If the incumbent detection interference requirement is satisfied, at step 708 incumbent signal sensing over the unused portion of the active communications channel is performed at the sensing unit. If the incumbent detection interference requirement is not satisfied, incumbent signal sensing over the unused portion of the active communications channel is not performed at the sensing unit and either a new sensing unit is selected at step 710 or the sensing unit continues normal operation and waits for a predetermined amount of time before again determining whether the incumbent detection interference requirement is met at step 712.

As indicated above, to determine whether the incumbent detection interference requirement is met, it can be determined whether or not a power level on the unused portion of the communications channel is below a required threshold to perform the incumbent signal sensing. For example, a path loss from an active transmitter to the sensing unit can be estimated and, based on a known active transmitter effective isotropic radiated power level, it can be determined whether the power level on the unused portion of the communications channel at the sensing unit is below a predetermined threshold. Alternatively, the received signal strength level of the active transmitter signal can be estimated and, based on the estimated level and a predetermined active transmitter splatter level, it can be determined whether a power level on the unused portion is below a predetermined threshold to perform the incumbent signal sensing.

Note that the various subscribers described do not have to cover precisely the same operating regions, frequency ranges, channel bandwidths or other parameters. Thus, while the technique described applies to TVWS usage such as Broadband Wireless Internet Service provided in TVWS, it may also be used in other frequency bands (e.g., 900 MHz, 3650 MHz, and in other Cognitive Radios). Examples include broadband wireless internet systems, wireless local area network (WLAN) systems (e.g., 802.11 based), WiMax (e.g., 802.16 based) systems (for both wide area and vehicular area networks), and meshed cognitive radio networks. In addition to the TV bands currently considered, the techniques may be used in several other national and international bands such as the NTIA Spectrum Sharing Test Bed Federal Bands (380-420 MHz) and the 3.6 GHz band. The techniques described above may also be applied to developing and potential IEEE Standards for TVWS (e.g., IEEE 802.22, 802.11y, and 802.16h).

In addition, although transmissions between the base station and secondary receivers have been primarily described, a transmitter other than the base station may be used. For example, in networks such as an ad-hoc network, secondary devices may communicate directly with each other rather than transmitting to a base station. In this case, transmission and sensing may occur by the transmitter and receiver, both of which are secondary devices, rather than by a base station and a secondary receiver. In such networks, the term subscriber (used extensively above) may thus be replaced with the term secondary receiver without loss of generality as the term subscriber refers to secondary devices that are registered with a base station. The term secondary transmitter encompasses both base stations and secondary devices acting as transmitters.

In various embodiments discussed herein, some of the disclosed methods may be implemented as a computer program product operating on one or more conventional processors, such as DSPs. The unique stored program instructions forming the computer program product control the processors to implement, in conjunction with certain non-processor circuits, some, most, or all of the functions previously described. The non-processor circuits may include, but are not limited to, a radio transceiver, signal drivers, clock circuits, power source circuits, and user input devices. As such, these functions may be interpreted as steps of a method for communication systems to share spectrum. Alternatively, some or all functions could be implemented by a state machine that has no stored program instructions, or in one or more application specific integrated circuits (ASICs), in which each function or some combinations of certain of the functions are implemented as custom logic. Of course, a combination these approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The subscriber may use a computer program product that includes a series of computer instructions fixed either on a tangible medium, such as a computer readable medium (e.g., flash memory, CD-ROM, ROM, fixed disk). The medium may be a tangible medium (e.g., optical or analog communications lines). The series of computer instructions embodies all or part of the functionality previously described herein with respect to the device. It should appreciate that such computer instructions can be written in a number of programming languages for use with many device architectures or operating systems. Furthermore, such instructions may be stored in any memory device, such as semiconductor, magnetic, optical or other memory and used by, for example, the DSP. It is expected that such a computer program product may be distributed as a removable medium with accompanying printed or electronic documentation (e.g., shrink wrapped software) or preloaded with a device (e.g., on system ROM or fixed disk).

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure and Summary section are provided to allow the reader to quickly ascertain the nature of the technical disclosure. They are submitted with the understanding that they will not be used to interpret or limit the scope or meaning of the claims. In the foregoing Detailed Description, it can be seen that various features are grouped together in various embodiments for the purpose of streamlining the disclosure. This method of disclosure is not to be interpreted as reflecting an intention that the embodiments require more features than are expressly recited in each claim. Rather, the inventive subject matter lies in less than all features of a single disclosed embodiment. Thus, the claims are hereby incorporated into the Detailed Description, with each claim standing on its own as a separately claimed subject matter.

Those skilled in the art will recognize that a wide variety of modifications, alterations, and combinations can be made with respect to the above described embodiments without departing from the spirit and scope of the invention and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims issuing from this application. The invention is defined solely by any claims issuing from this application and all equivalents of those issued claims.

The invention claimed is:

1. A method of performing sensing for incumbent signals in a secondary communications system, the method comprising:
   determining whether an unused portion of an active communications channel meets an incumbent detection interference requirement at a sensing unit, wherein the step of determining comprises estimating a path loss from an active transmitter in the secondary communications system to the sensing unit in the secondary communications system and, based on a known active transmitter power level, determining whether a received power level on the unused portion of the communications channel at the sensing unit is below a predetermined threshold required to perform the incumbent signal sensing; and
   if the incumbent detection interference requirement is satisfied on the unused portion of the active communications channel, performing incumbent signal sensing over the unused portion of the active communications channel at the sensing unit.

2. A method of performing sensing for incumbent signals in a secondary communications system, the method comprising:
   determining whether an unused portion of an active communications channel meets an incumbent detection interference requirement at a sensing unit, wherein the step of determining comprises estimating a received signal strength level of an active transmitter signal on the communications channel and, based on the estimated received signal strength level and a predetermined active transmitter splatter level, determining whether a power level on the unused portion of the communications channel is below a predetermined threshold to perform the incumbent signal sensing; and
   if the incumbent detection interference requirement is satisfied on the unused portion of the active communications channel, performing incumbent signal sensing over the unused portion of the active communications channel at the sensing unit.

3. A method of retaining channel use by a secondary system, the method comprising:
   splitting into multiple sub-bands a channel used during periods of normal communication between a secondary transmitter and a secondary receiver of the secondary system;
   communicating to the secondary receiver scheduling of a quiet period between adjacent periods of normal communication, the quiet period containing multiple quiet phases; and
   permitting communication between the secondary transmitter and the secondary receiver on one of the sub-bands simultaneous with sensing for incumbent signals by the secondary transmitter or the secondary receiver on another of the sub-bands during the quiet phases.

4. The method of claim 3, further comprising scheduling activities during the quiet phases such that during the same quiet phase neither transmission and sensing by the same device nor sensing and communication on the same sub-band of the channel occurs.

5. The method of claim 3, further comprising limiting transmission between the secondary transmitter and the secondary receiver to only one of the sub-bands of the channel during each quiet phase.

6. The method of claim 5, further comprising scheduling transmissions between the secondary transmitter and the secondary receiver such that transmissions occur on every sub-band over the course of the quiet period.

7. The method of claim 3, further comprising scheduling activities during the quiet phases such that each of the secondary transmitter and the secondary receiver senses every sub-band over the course of the quiet period.

8. The method of claim 3, further comprising reducing a power level of the transmission during the quiet period and increasing the power level during the normal communication periods.

9. The method of claim 3, further comprising:
   ascertaining a location of the secondary receiver; and
   determining whether the secondary receiver is at least a minimum distance from the secondary transmitter, the minimum distance being established as the distance at which a transmission from the secondary transmitter on one of the sub-bands desenses the secondary receiver from detecting an incumbent on another of the sub-bands.

10. The method of claim 9, wherein determining whether the secondary receiver is at least the minimum distance from the secondary transmitter comprises estimating a RSSI level of a signal from the secondary transmitter at the secondary receiver and, based on the RSSI level and a pre-determined transmitter splatter level of the secondary transmitter, determining if an energy level on the sub-band on which the incumbent is to be sensed is below a predetermined sensing threshold.

11. The method of claim 9, further comprising relying on the secondary transmitter to perform incumbent sensing upon determining that the secondary receiver is less than the minimum distance.

12. The method of claim 3, wherein the secondary system comprises first and second secondary receivers and the channel is split into at least three sub-bands, the method further comprising:
   permitting communication between the secondary transmitter and one of the first and second secondary receivers on a first of the sub-bands simultaneous with sensing for incumbent devices by the secondary transmitter or the secondary receiver on a second of the sub-bands during the quiet phases, the first and second sub-bands separated by a third of the sub-bands; and
   scheduling sensing for incumbent devices by the other of the first and second secondary receivers on at least one of the second or third sub-bands when communication between the secondary transmitter and the one of the first and second secondary receivers occurs on the first sub-band.

13. The method of claim 12, further comprising scheduling sensing by at least one of the first and second secondary receivers on at least one of the sub-bands during sufficiently many of the quiet phases of the quiet period such that scheduling of the at least one of the first and second secondary receivers sensing in the one of the sub-bands during a future quiet period is avoided.

14. The method of claim 12, further comprising:
   ascertaining locations of the first and second secondary receivers;
   segregating the first and second secondary receivers by distance from the secondary transmitter; and
   determining whether the first and second secondary receivers are at least a minimum distance from the secondary transmitter, the minimum distance being established as the distance at which a transmission from the secondary transmitter on one of the sub-bands desenses the first or second secondary receiver from detecting an incumbent on another of the sub-bands.

15. A secondary system comprising:
   a secondary transmitter; and
   secondary receivers configured to communicate with the secondary transmitter over a secondary channel during periods of normal communication,
   wherein the secondary transmitter is configured to transmit a schedule to the secondary receivers for communications on sub-bands of the secondary channel during a quiet period between adjacent periods of normal communication, the quiet period containing multiple quiet phases, the schedule specifying for each secondary receiver when and on which sub-band communication with the secondary transmitter and sensing for incumbent devices are to occur, during at least one of the quiet phases one of the secondary receivers senses on one of the sub-bands while receiving a transmission from the secondary transmitter.

16. The system of claim 15, wherein communication between the secondary transmitter and each secondary receiver is scheduled to be limited to only one of the sub-bands during each quiet phase.

17. The system of claim 15, wherein transmissions between the secondary transmitter and the secondary receivers are scheduled such that transmissions occur on every sub-band over the course of the quiet period.

18. The system of claim 15, wherein the secondary transmitter and each secondary receiver is scheduled to sense every sub-band over the course of the quiet period.

19. The system of claim 15, wherein at least one of the secondary transmitter or at least one secondary receiver is configured to reduce a transmission power level during the quiet period and increase the power level during the normal communication periods.

* * * * *

UNITED STATES PATENT AND TRADEMARK OFFICE
CERTIFICATE OF CORRECTION

PATENT NO. : 8,224,364 B2  
APPLICATION NO. : 12/623588  
DATED : July 17, 2012  
INVENTOR(S) : Gurney et al.

Page 1 of 1

It is certified that error appears in the above-identified patent and that said Letters Patent is hereby corrected as shown below:

In the Drawings:

In Fig. 6, Sheet 5 of 6, for Tag "612", delete "QUITE" and insert -- QUIET --, therefor.

Signed and Sealed this  
Twenty-ninth Day of January, 2013

David J. Kappos  
*Director of the United States Patent and Trademark Office*